July 27, 1954    ÅKE ARBORGH ET AL    2,684,836
VENTURI TYPE GAS SCRUBBER
Filed Jan. 15, 1952
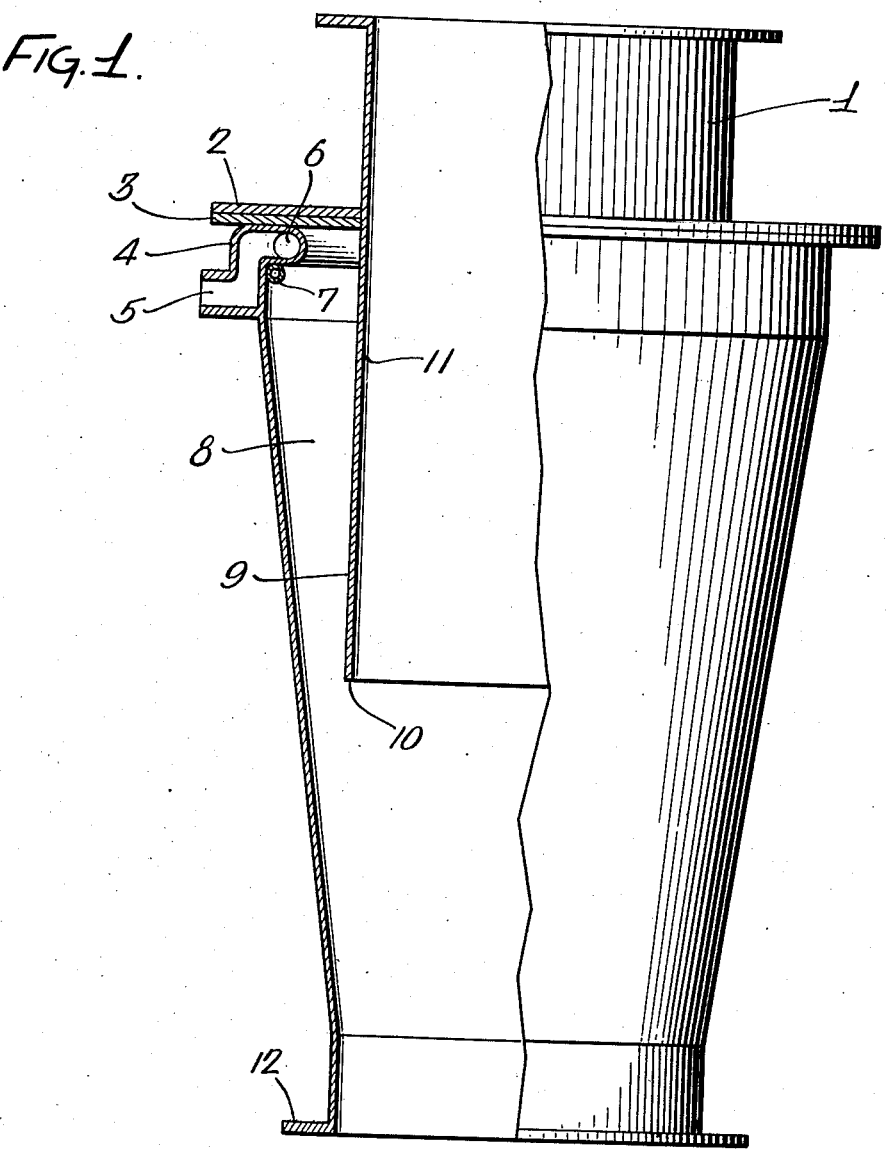
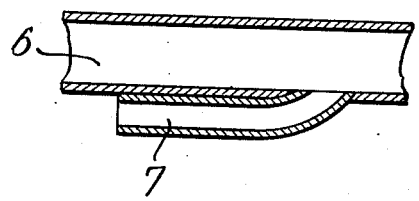
Inventors:
Åke Arborgh
Evert Krantz
by their Attorneys
Howson & Howson Patented July 27, 1954

2,684,836

UNITED STATES PATENT OFFICE 2,684,836

VENTURI-TYPE GAS SCRUBBER

Åke Arborgh, Jonkoping, and Evert Krantz, Stockholm, Sweden, assignors to A. B. Svenska Fläktfabriken, Stockholm, Sweden Application January 15, 1952, Serial No. 266,496

Claims priority, application Sweden January 15, 1951

1 Claim. (Cl. 261—112)

As well known a liquid is used for separating dust from air or gases in so-called Venturi-scrubbers. In scrubbers of this type, the dust-contaminated gas is forced through a Venturi tube and washing liquid is injected into the tube at its narrowest section—in most cases transversely of the gas flow—the liquid being atomized by the high velocity of the gas and the suspended dust particles being intercepted by the droplets which are subsequently separated from the gas stream. In the contracting passage between the gas and dust inlet and the throat of the Venturi tube in which the liquid is supplied to the mixture of gas and dust there is an intermediate zone between the entirely dry and wet wall surfaces. It has now been found that splashing or spraying of liquid from the throat of the scrubber has the effect of producing dust deposits in the said intermediate zone. These deposits are also inclined to occur still higher up in the dry part of the scrubber. This inconvenience may occur due to the capillary powers of the liquid. In such deposits the area of the supply duct of the gas and dust mixture is reduced and output requirements on any fan used in the system is increased. This disadvantage is particularly great when working with lime, gypsum and similar hygroscopic material. The present invention eliminates this disadvantage.

The present invention is characterized by an arrangement in which the opening and the front part of the supply duct of the gas and dust mixture is surrounded by a chamber having a greater cross section than that of the supply duct so that the annular flanges at the outer end of the chamber are in close contact with the outside envelope surface of the supply duct, and by providing in the angle between the flange and the chamber a suitably circular coil pipe having openings for discharging liquid in a manner to cause it to flow over the entire inside surface of the chamber.

A modification of the invention is characterized by that the chamber is provided with a diminished cross section reckoned in the direction of flow of the gas and dust mixture.

According to another modification of the invention the supply of liquid is performed by means of some cylindrical nozzles disposed tangentially at the openings of the circular coil pipe.

The invention will now be more fully described in connection with the attached drawing showing a modification as an example.

Figure 1 shows a cross section of the arrangement.

Figure 2 shows in detail one of the cylindrical nozzles.

In the drawing 1 designates the supply duct of the gas and dust mixture which is to be purified by the wet process of a Venturi-scrubber. The duct 1 has its outlet within a chamber 8 provided with a somewhat greater cross section. The flanges 2 and 3 contact closely the chamber 8 at the outside envelope surface of the supply duct 1. The arrangement for supply of liquid is designated 5, 6, 7. A detail of this arrangement is shown in Figure 2. 11 designates the inside dry envelope surface of the supply duct of the gas and dust mixture. The outlet edge of same is designated 10. A flange 12 connects the chamber to the throat section of a Venturi-scrubber which is not shown.

The arrangement according to the invention operates in the following manner. The dry mixture of gas and dust is assumed to pass through the duct 1. The inside walls of the chamber 8 are entirely wetted. The liquid must be controlled in order to avoid a supply under such a high pressure that a diffusion of liquid particles will occur from the chamber 8 into the inner (dry) part of the duct 1. The duct 1 extends into the chamber 8 to such an extent that a continuous film of liquid will form on the inner surface before the gas of the chamber 8 and dust mixture reaches the walls of the chamber.

According to a convenient modification the chamber is diminished downwards so that the accumulation of liquid will be great where the risk of deposits has appeared to be of very disturbing effect. It is thereby possible to reduce the air resistance between the opening of the supply duct and the walls of the chamber. Also other modifications are possible within the scope of the present invention.

We claim:

In scrubbing apparatus, a downwardly tapered casing defining a chamber, a supply duct of smaller diameter than the casing extending downwardly into said chamber coaxially thereof with its outlet end disposed intermediate the upper and lower ends of the casing, means providing a closure between the upper end of the casing and the duct, a liquid discharge pipe extending about the upper end of the casing and provided with outlet openings internally of the casing to discharge liquid onto the interior surface of the casing and forming a continuous liquid film thereon, and a nozzle connected to each of said outlet openings of the discharge pipe disposed substantially tangent thereto and extending along portions of the length thereof.

References Cited in the file of this patent

UNITED STATES PATENTS

| Number | Name | Date |
|---|---|---|
| 2,003,184 | Friedrich | May 28, 1935 |
| 2,105,056 | Sartell | Jan. 11, 1938 |

FOREIGN PATENTS

| Number | Country | Date |
|---|---|---|
| 252,873 | Italy | Oct. 15, 1926 |